(12) United States Patent
Morozov et al.

(10) Patent No.: US 8,331,198 B2
(45) Date of Patent: Dec. 11, 2012

(54) GAS-FILLED BUBBLE SOUND SOURCE

(75) Inventors: Andrey K. Morozov, Falmouth, MA (US); Douglas C. Webb, Falmouth, MA (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

(21) Appl. No.: 13/053,095

(22) Filed: Mar. 21, 2011

(65) Prior Publication Data

US 2012/0243377 A1    Sep. 27, 2012

(51) Int. Cl.
*G10K 9/10* (2006.01)
*G01V 1/04* (2006.01)

(52) U.S. Cl. .................... 367/142; 367/141; 181/120

(58) Field of Classification Search .......... 367/140–142, 367/166, 171; 181/113, 115, 119–120
See application file for complete search history.

(56) References Cited

U.S. PATENT DOCUMENTS

| | | | |
|---|---|---|---|
| 2,901,997 A | 9/1959 | Brooks | |
| 3,056,104 A | 9/1962 | De Kanski et al. | |
| 3,105,456 A | 10/1963 | Gongwer | |
| 3,194,207 A | 7/1965 | Dunne | |
| 3,219,970 A | 11/1965 | Sims | |
| 3,578,102 A | 5/1971 | Ross et al. | |
| 3,676,840 A | 7/1972 | Bays | |
| 3,720,908 A | 3/1973 | McCoy et al. | |
| 4,135,142 A | 1/1979 | Percy et al. | |
| 4,142,171 A * | 2/1979 | Pickens | 367/143 |
| 4,198,706 A | 4/1980 | Elliott | |
| 4,396,088 A | 8/1983 | Bayhi | |
| 4,400,805 A | 8/1983 | Nadler | |
| 4,646,276 A * | 2/1987 | Kowalewski et al. | 367/142 |
| 4,855,964 A | 8/1989 | Fanning et al. | |
| 4,961,175 A | 10/1990 | Blue et al. | |
| 4,961,181 A | 10/1990 | Elliott | |
| 5,210,718 A | 5/1993 | Bjelland et al. | |
| 5,999,491 A | 12/1999 | Harvey et al. | |
| 6,076,629 A | 6/2000 | Tengham | |
| 6,085,862 A | 7/2000 | Tenghamn | |
| 6,782,109 B2 | 8/2004 | Sheplak et al. | |
| 7,266,046 B1 | 9/2007 | Ruffa | |
| 7,633,835 B1 | 12/2009 | Erikson et al. | |
| 2006/0059801 A1 | 3/2006 | Allaei | |
| 2010/0039900 A1 | 2/2010 | McAleenan et al. | |

OTHER PUBLICATIONS

Sims, Claude C., Bubble Transducer for Radiating High-Power Low-Frequency Sound in Water, The Journal of the Acoustical Society of America, vol. 32, No. 10, Oct. 1960, 4 pages.

Kramer, F.S. et al., Seismic Energy Sources, First Annual Offshore Technology Conference, Houston, Texas, May 18-21, 1969, Paper No. OTC 1119, 30 pages.

Decarpigny, Jean-Noel et al., The Design of Low-Frequency Underwater Acoustic Projectors: Present Status and Future Trends, IEEE Journal of Oceanic Engineering, vol. 16, No. 1, Jan. 1991, 16 pages.

(Continued)

*Primary Examiner* — Ian Lobo
(74) *Attorney, Agent, or Firm* — Foley & Lardner LLP

(57) ABSTRACT

A sound source comprises a bubble configured to be filled with a gas, an actuator configured to perturb the gas within the bubble, and a processing circuit configured to provide a control signal to the actuator to cause the actuator to perturb the gas within the bubble at a frequency defined by the control signal.

10 Claims, 7 Drawing Sheets

OTHER PUBLICATIONS

Ensign, T. H. et al., Electroacoustic Performance Modeling of the Gas-Filled Bubble Projector, Presented at Third International Workshop on Transducers for Sonics and Ultrasonics, May 6-8, 1992, Naval Research Lab, Orlando, Florida, 8 pages.

International Search Report and Written Opinion for PCT/US2012/029807, mailed Jun. 13, 2012, 9 pages.

Morozov et al., A Sound Projector for Acoustic Tomography and Global Ocean Monitoring, IEEE Journal of Oceanic Engineering, vol. 28, No. 2, Apr. 2003, 12 pages.

Duda et al., Evaluation of a Long-Range Joint Acoustic Navigation/Thermometry System, Proceedings of Oceans, 2006, 6 pages.

Freitag et al., Under-Ice Acoustic Communications and Navigation for Gliders and AUVs, American Geo[hysical Union, Fall Meeting 2009, abstract #OS43B-1389, Feb. 2009, 1 page.

Morozov et al., Underwater Tunable Organ-Pipe Sound Source, J. Acoust. Soc. Am. 122 (2), pp. 777-785, Aug. 2007, 9 pages.

Morozov et al., Underwater Sound Source with Tunable Resonator for Ocean Acoustic Tomography, J. Acoust. Soc. Am. 116, p. 2635, 2004, 3 pages.

Sagen et al., Acoustic Technologies for Observing the Interior of the Artic Ocean, OceanObs '09, Venice, Italy, Sep. 2009, 5 pages.

Webb et al., A New Approach to Low Frequency Wide-Band Projector Design, Proceedings of Oceans, 2002, pp. 2342-2349, 10 pages.

Morozov et al., Underwater Acoustic Technologies for Long-Range Navigation and Communications in the Arctic, taken from URL: http://promitheas.iacm.forth.gr/UAM_Proceedings/view_paperphp?pageid=384, Jun. 2011, 8 pages.

* cited by examiner

US 8,331,198 B2

GAS-FILLED BUBBLE SOUND SOURCE

BACKGROUND

Low frequency acoustic and seismo-acoustic projectors find applications in underwater ocean acoustic tomography, long-range acoustic navigation and communications and deep-bottom penetration seismic profiling in the offshore oil and gas industry. Such sources may be used in Arctic under-ice acoustic far-range navigation and communications, underwater global positioning systems (RAFOS), and long-range ocean acoustic tomography and thermometry. Low-frequency underwater sound sources should be powerful and efficient.

The low frequency source can be an explosive (dynamite), or it can use more complicated technology like an air gun providing single pulses, or like vibroseis providing continuous frequency sweeps. Some acoustic sources in use for seismic applications, such as air gun, plasma (sparker) sound sources and boomers, are of the impulse type, where the transmitter emits a large non-coherent pressure pulse during a short time interval. Seismic air-gun surveys, such as those used in the exploration of oil and gas deposits underneath the ocean floor, produce loud, sharp impulses that propagate over large areas and increase noise levels substantially. Their signal is not highly controllable, either in frequencies content or repeatability. Coherent sound sources such as marine vibroseis can be much quieter and potentially less harmful for marine environments and should be used instead of air-guns in certain exploration activities. Current continuous wave type sources make use of hydraulic, pneumatic, piezo-electric or magneto-strictive drivers and different type of resonance systems to store acoustic energy and to improve impedance matching, when generating low-frequency sound waves in water. The power output of a simple acoustic source is proportional to the squares of volume velocity and frequency and needs a large vibrating area to achieve reasonable levels. As result the sound source can become unacceptably large and expensive.

One proposal is a gas filled bubble as a means of modifying the acoustic load impedance on the radiating face of a transducer, such as that shown in U.S. Pat. No. 3,219,970 to Sims. The Sims patent, however, discloses a low 3-5% efficiency.

SUMMARY

According to one embodiment, a sound source comprises a bubble configured to be filled with a gas, an actuator configured to perturb the gas within the bubble, and a processing circuit configured to provide a control signal to the actuator to cause the actuator to perturb the gas within the bubble at a frequency defined by the control signal.

According to another embodiment, a method of generating underwater sound waves comprises providing an elastic bubble filled with a gas, perturbing the gas within the bubble, and controlling the perturbing of the gas within the bubble to emit sound waves over a plurality of frequencies.

DETAILED DESCRIPTION OF EXEMPLARY EMBODIMENTS

Some embodiments described herein may provide a simple and less expensive engineering solution for a large volume, low-frequency resonance system. Some embodiments described herein may provide an improved radiated power and/or an improved radiated impedance, as reflected to a driver. Some embodiments described herein may provide for increased electro-acoustical efficiency. Some embodiments described herein may provide for a lighter, smaller, and lower cost sound source. Some embodiments described herein may provide a coherent signal that is less damaging to marine life.

Figure 1:
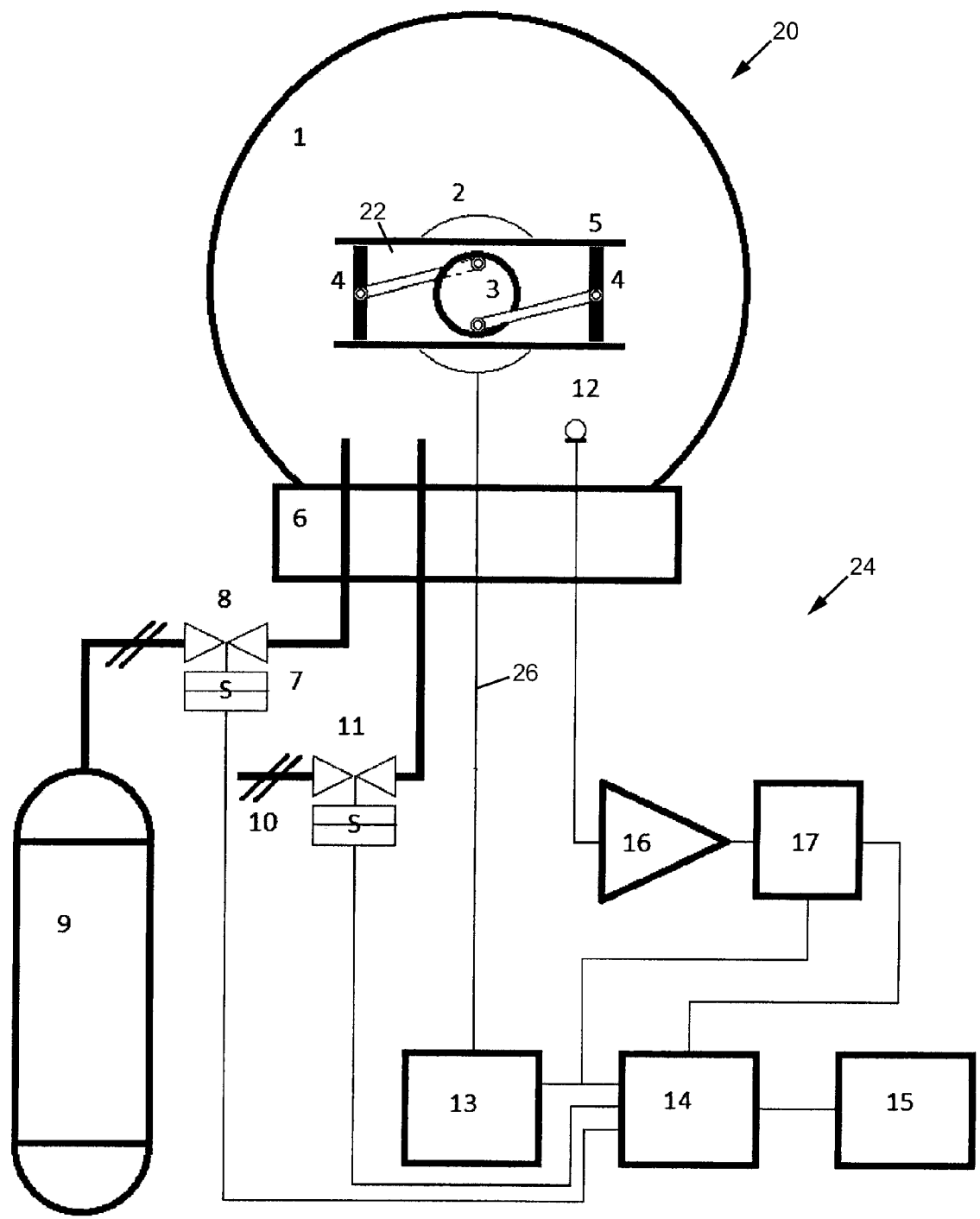
FIG. 1 is a block diagram showing a sound source and control system, according to an exemplary embodiment.

Referring first to FIG. 1, a gas-filled bubble sound source or resonator 20 is shown. Source 20 comprises a bubble, balloon or air bag 1, which may be a gas-filled bubble sound source. The gas may be air, Nitrogen, or other gases. For example, Nitrogen may be used for deep water and air may be used for shallow water. Bubble 1 may be manufactured from an elastic material, such as fiber reinforced latex, chloroprene, neoprene, buna rubber, etc. The elastic material may be selected to have a very low level of gas leakage for long-term deployments. Source 20 comprises a base, end-cap or interface 6 configured to seal a portion of bubble 1 and to further provide conduits for electrical and mechanical inputs and outputs to bubble 1. Source 20 may be a coherent source of changeable or changing volume velocity (velocity per area).

Source 20 comprises an actuator or driver 5 shown in this embodiment in the form of a symmetrical piston system placed or disposed inside or within the bubble volume (though it may be disposed outside of or on a surface of the bubble in alternative embodiments). Actuator 5 may be any actuator configured to perturb bubble 1, for example in a manner that will cause bubble 1 to vibrate or oscillate so that energy will be exchanged between the pressure of the gas inside and the inertia of the water at the surface of bubble 1. Actuator 5 may be a mechanically-driven actuator in this exemplary embodiment. Actuator 5 comprises a crankshaft 3 driven by an electrically motor 2 which in turn drives a plurality of symmetrically moving pistons 4. Two moving pistons are provided in this embodiment, though three, four, or more pistons or other moving members may be used in alternative embodiments. In this embodiment, pistons 4 are configured to move synchronically in opposite directions. The moveable members may be configured to move in a same plane but opposed in any direction. Actuator 5 may be configured to make very small changes in pressure within bubble 1, relative to pressure changes made by the gas supply system described below. A housing 22 may be a cylindrical housing or other shape configured to define an internal area between pistons 4 sealed for air pressure. The internal area is subjected to a fluctuating pressure from the moving pistons 4. The electrical motor driver 2 is controlled by control signal from a computer (processing circuit 14) and synchronized with a digitally synthesized signal waveform. The waveform of the control signal may be a sine wave, or other waveform. The processing circuit 14 may be configured to generate the control signal in response to a programmed algorithm set by an operator of source 20, for example to control source 20 to provide a single frequency output, plurality of frequency outputs, etc. over one or more time periods. In one example, the actuator 5 is disposed within the bubble, for example, in a configuration where water surrounding bubble 1 does not come into contact with the actuator, or in contact with either side of housing 22 or with either of pistons 4.

Source 20 further comprises a computer controlled gas supply system 24 configured to regulate the volume and/or pressure of gas inside bubble 1 in proportion to a transmitted signal from a processing circuit 14. Gas supply system 24 comprises a tank 9 with compressed air or liquid Nitrogen connected to bubble 1 with air pipes 7 via a solenoid controlled valve 8. Tank 9 may be disposed proximate bubble 1 or via an extended conduit or hose to a pump on a ship deck on a surface of the water. Gas supply system 24 is configured to fill bubble 1 with gas from external tank 9 or from the ship through an underwater air hose and to release gas through a solenoid controlled release valve or vent 11 and pressure release pipe 10. Gas supply 24 may further comprise a processing circuit 14 configured to control solenoids S of valve 8 and vent 11 and an electrical driver 13 configured to drive actuator 5. Processing circuit 14 may be coupled to a precision clock 15. The precision of clock 15 may depend on stability demand. For example, a temperature-compensated crystal oscillator (TCXO) provides ±1 ppm frequency stability over the −40° C. to +85° C. industrial temperature range. As another example, clock 15 may be a Rubidium or Cesium atomic clock with stability better than 0.0001 ppm. As another example, a chip scale atomic clock (CSAC) may be used, such as a Symmetricom SA.45s having a precision of ±5.0E-11.

A sensor, microphone, or hydrophone 12 is coupled to an analog-digital converter (ADC) input of processing circuit 14. Sensor 12 is disposed inside bubble 1 and provides a feedback signal to processing circuit 14. Processing circuit 14 is configured to keep a resonance frequency of bubble 1 approximately or substantially equal to a central frequency of a signal transmitted by bubble 1, by controlling gas volume inside the bubble using solenoids and valves 8, 11. A phase difference between a signal from sensor 12 and a signal sent to control actuator 5 is used as an indicator of difference between the resonance frequency of bubble 1 and central frequency of emitted signal. Sensor 12 is coupled through an amplifier 16 to a phase comparator 17 having as its inputs the amplified signal from sensor 12 and the signal sent to control actuator 5 (or as shown to control electrical driver 13 to control actuator 5), and having as its out put a compared signal sent to processing circuit 14 for further processing as part of a feedback loop. Gas supply system 24 can be used to keep bubble 1 in resonance with an instantaneous frequency of a linear frequency modulated signal sweeping in a large frequency bandwidth for high precision bottom penetration profiling.

A spherical pressure gas-filled underwater bubble or balloon manufactured from an elastic material offers a large radiating area. The radius of the bubble and its surface area depend upon depth and frequency: for example, at a 1500 m depth, a 2 m radius bubble will have a resonance frequency of 20 Hz, and a bubble area of 50 square meters; for a frequency of 150 Hz, the radius will be 0.275 m and have an area about 0.95 square meter. For the sound source depth of 100 meters, a bubble with radius 1.1 meter and area 15 square meters will have 10 Hz frequency resonance, and a bubble with radius 0.11 meters and area only 0.15 square meter will have a resonance of 100 Hz. In one embodiment, the bubble can be less than or equal to about 2 meters radius and less than or equal to about 50 square meters area and greater than or equal to about 0.11 meter radius and greater than or equal to about 0.15 square meters area. In alternative embodiments, radii and surface areas may be greater than or less than these sizes. The bubble may function as a good impedance transformer, which increases the resistive component of the radiation impedance. The radiated impedance of the bubble projector, as reflected to the actuator or driver, is larger than for a direct radiator, which implies that the radiated power and the electro-acoustical efficiency are increased. The driver for the bubble projector may supply greater blocked pressure and reduced volume displacement than the direct emitter when both are operating at the same radiated power. To achieve high efficiency, a symmetrical air pump with open cylinders may be used having a closed central part between the cylinders, driven by an electrical motor controlled by a computer, and synchronized with digitally synthesized signal waveforms. When the air pump driver has just a closed central part (embodiment of FIG. 9A), the air pump has no resonance. This embodiment is suitable for use to sweep over a large band by changing exiting frequency and tuning the bubble by changing its dimensions. When the air pump is configured as in the embodiment of FIG. 9B, it will have resonance because the central part will have a form of Helmholtz resonator. The central part of the driver may have a form of Helmholtz resonator with its own resonance frequency. This embodiment is suitable for use to expand bandwidth in a case where the sound source may not by sweeping but may be using broadband signals with the central frequency in the middle of the frequency band of the sound source. The bubble resonance frequency and driver resonance frequency may be closely grouped to form a doubly resonant projector. This provision yields transmitting bandwidth of ½ octave or greater.

Figure 2:
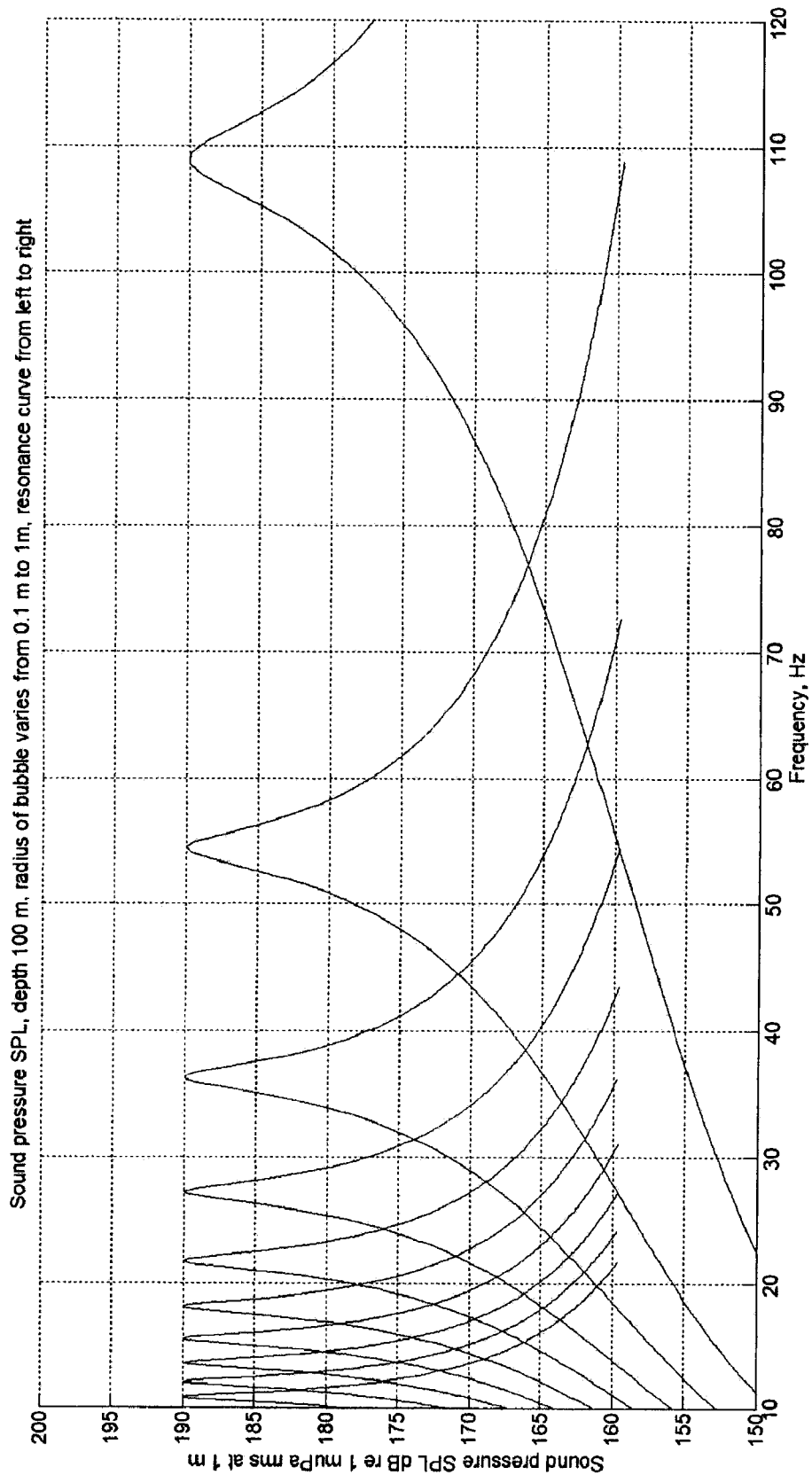
FIG. 2 is a graph depicting the sound pressure level (SPL) of a bubble source with radius varying from 0.1 m to 1 m at a depth of 100 meters, according to an exemplary embodiment.
Figure 3:
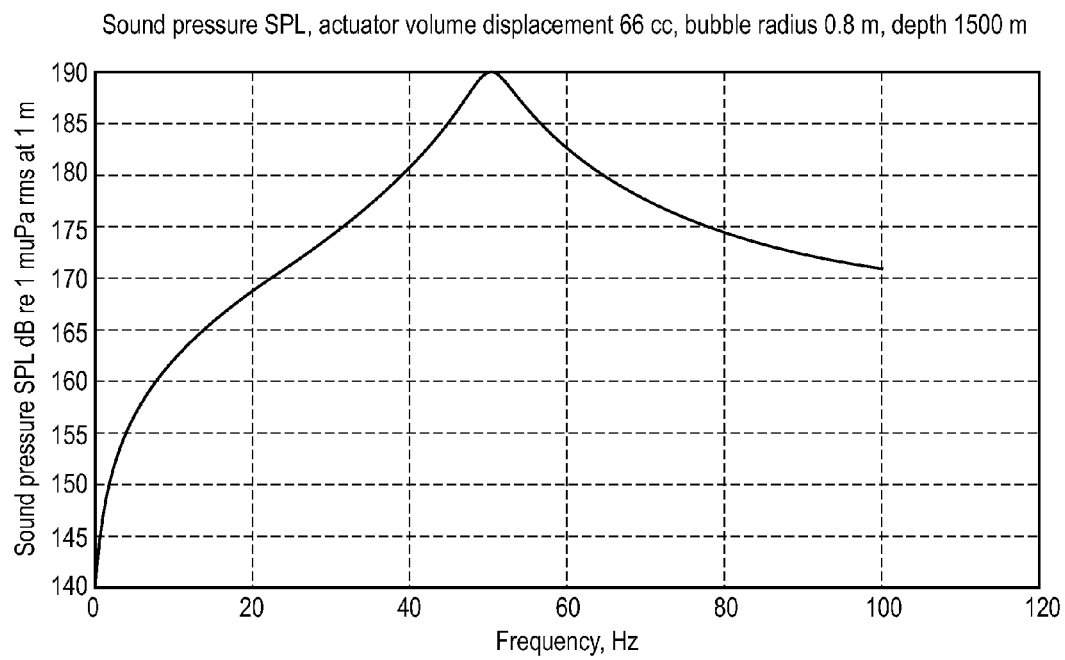
FIG. 3 is a graph depicting the sound pressure level (SPL) of a 50 Hz bubble source with radius 0.8 m and actuator volume displacement 67 cc at the depth 1500 meters, according to an exemplary embodiment.

Referring now to FIGS. 2 and 3, solutions of equations for sound pressure of a bubble source are shown, according to two exemplary embodiments. The pressure inside a bubble projector provided by a internal source of volume velocity can be described by known differential equations in the following form:

$$\frac{d^2 p}{dt^2} + \frac{\omega_r}{Q}\frac{dp}{dt} + \omega_r^2 = \frac{P_0}{V_0}\frac{dV_a}{dt} \quad (1)$$

$$\frac{\omega_r}{Q} = \frac{\gamma P_0 S_0}{V_0 \rho c} = \omega_r k_r a \quad (2)$$

where $$\omega_r^2 = \frac{\gamma P_0 S_0}{V_0 \rho c}$$

is the resonance frequency of a spherical bubble with a radius a, volume $V_0=(4/3)\pi a^3$, and pressure $P_0$; $\gamma(1.4)$ is the ratio of the specific heats at constant pressure to specific heat at constant volume for gas within the bubble; $k_r=\omega_r/c$ is the resonance wave number; $Q=1/(k_r a)$ is the Q-factor. The solution of equation (1) is straight-forward for simulation and calculation of necessary volume velocity for an actuator. As shown in FIGS. 2 and 3, resonance frequency and inverted Q-factor are increasing proportionally with the square root of pressure or depth. The bandwidth of the bubble source can be potentially increased twice by adding additional resonance in the acoustical driver. Also, the resonance acoustical drive can be much more efficient.

FIG. 2 shows the sound pressure level (SPL) of a bubble source at depth 100 meters, as the radius of the bubbles varies from 0.1 m to 1 m. FIG. 2 shows how by changing bubble dimension, the resonance frequency can be swept. For example, in shallow water, the bubble resonator can become very high Q and low bandwidth, and to achieve a necessary bandwidth of 10-100 Hz, the resonance frequency can be swept simultaneously or along with the signal frequency of the control signal to keep the bubble in resonance with the control signal. FIG. 3 shows SPL of a 50 Hz bubble source with radius 0.8 m and actuator volume displacement 67 cc at the same depth of 1500 meters.

The necessary level of volume velocity displacement (16.7 cc for the first example of FIG. 2 and 66 cc for the second example of FIG. 3) at the frequencies lower than 150 Hz can be achieved by a standard symmetrical piston system, where pistons driven by an electrical motor are moving synchronically in opposite directions with an internal area between pistons sealed for air pressure. For example, the actuator may be rebuilt from one typically used in a standard vacuum and pressure air pumps, for example, GAST 5LCA-251-M550NGX manufactured by Gast Manufacturing, Inc., Benton Harbor, Mich. The efficiency of such pumps may be as great as 30%. The brushless electrical motor with a computer controlled driver can reproduce a digitally synthesized signal.

The resonance frequency of a bubble resonator depends on internal pressure and on its volume and therefore may be controlled by pumping air from an external pressure tank into the bubble or releasing air from the bubble to change the dimensions of the bubble. The processing circuit 14 may be configured to change resonance frequency by pumping gas and expanding the bubble or by releasing gas and shrinking bubble, whereby one or more dimensions of the bubble are increased or descreased, respectively. To keep air-filled bubble 1 in resonance with a central frequency of a radiated signal, a microphone phased locked loop (PLL) can be applied (for example, as part of processing circuit 14). A phase difference between internal bubble pressure and a transmitted control signal sent on line 26 is an indicator of resonance. Processing circuit 14 is configured to keeping the phase difference close to zero in order to keep bubble resonator substantially in resonance with the signal emitted by bubble 1. In shallow water, when the Q-factor of the bubble resonator is very high and frequency bandwidth is too narrow for broadband signal transmission, the same PLL system can be configured to keep the bubble in resonance with the instantaneous frequency of a slowly changing frequency modulated signal. Such a system can be configured to sweep through a predetermined bandwidth, such as from 10 Hz to 100 Hz, and became a coherent replacement of widely used air-guns.

Figure 4:
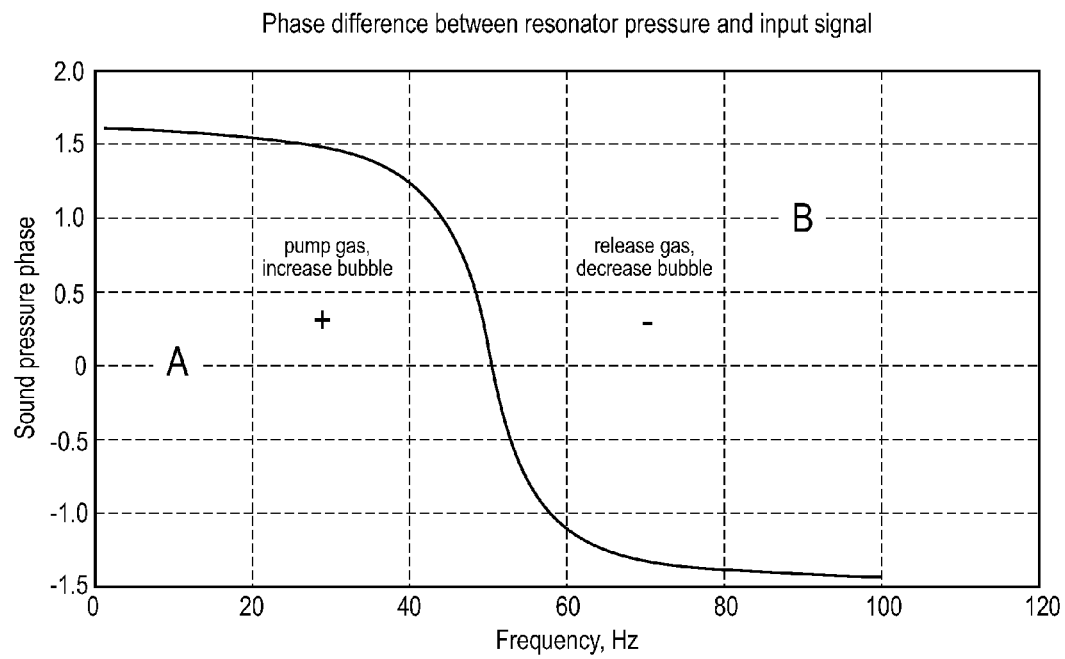
FIG. 4 is a graph depicting a difference of phase between pressure inside a bubble resonator and input exiting signal for a bubble sound source with radius 0.8 m at the depth 1500 meters, according to an exemplary embodiment.

FIG. 4 shows how phase difference between a control signal (input signal to actuator 5) and internal bubble pressure indicates the resonance frequency shift relative to the central signal frequency. The parameters of the bubble sound source are the same as in FIG. 3: resonance frequency is equal to 50 Hz, bubble has radius 0.8 m, actuator volume displacement is 67 cc and depth is the 1500 meters. The internal sound pressure is proportional to a signal received from internal microphone 12, FIG. 1. The phase of that signal can be compared by a phase comparator (part of processing circuit 14) with the phase of sound source input signal. If internal pressure phase is larger than input signal phase (region A), then the resonance frequency of the bubble is higher than the frequency of the emitted signal and processing circuit 14 is configured to control the system to pump air inside bubble and increase its radius to decrease resonance frequency. If the phase of the microphone signal is lower than the phase of input signal (region B), then the resonance frequency of the bubble should be increased by releasing gas outside and decreasing its radius. In this case, the sign (+/−) on the output of the signal comparator shows whether to pump or release gas from the pressure tank. Such control can be used for keeping a bubble in resonance with the central frequency of a deepwater sound source. The same system can run continuously with a linear frequency modulated signal keeping the bubble resonator in resonance with the instantaneous frequency of the radiated signal. The last approach can greatly expand frequency bandwidth of a frequency swept signal and make it useful for air-gun replacement in the frequency band 10-100 Hz.

Figure 5:
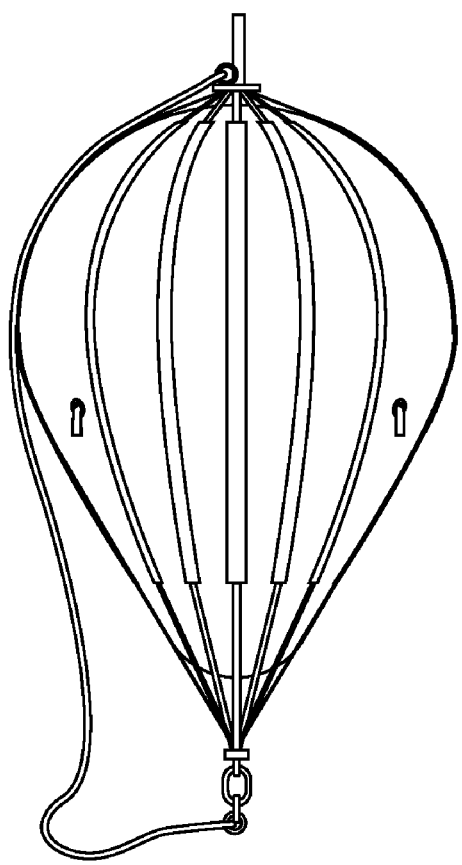
FIG. 5 is a picture of a lift bag suitable for use with the sound source of FIG. 1, according to an exemplary embodiment.

FIG. 5 shows a commercially available (or commercially off-the-shelf) air lift bag. Lift bags are available in very large diameters. For example, the lift bag depicted had more than a 1 meter radius which is suitable for a 20-30 Hz sound source. The bubble can be used as a flotation for a mooring design and can be filled with air continuously during deployment. High pressure air hoses for 1500 meters are also available and can be used to pump air from a ship's deck.

Figure 6:
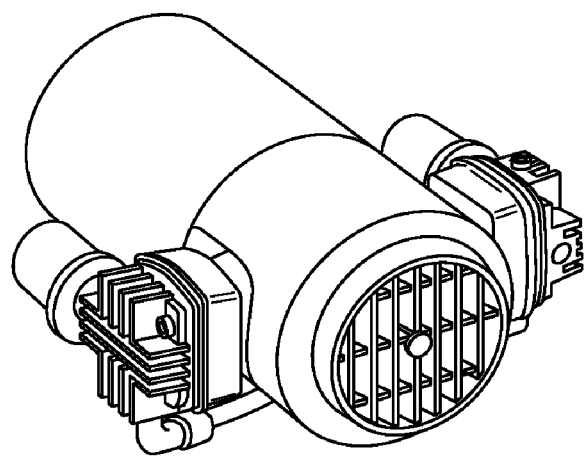
FIG. 6 is a picture of an air pump actuator for use with the sound source of FIG. 1, according to an exemplary embodiment.

FIG. 6 depicts an air pump. The heads of the cylinders of the air pump may be removed. With valves, pipes and the head of the cylinders removed and an additional acoustical resonator added, the efficiency may be greater than 30%. The electrical motor may be replaced with a brushless motor with a driver for reproduction of a digitally synthesized signal.

Figure 7:
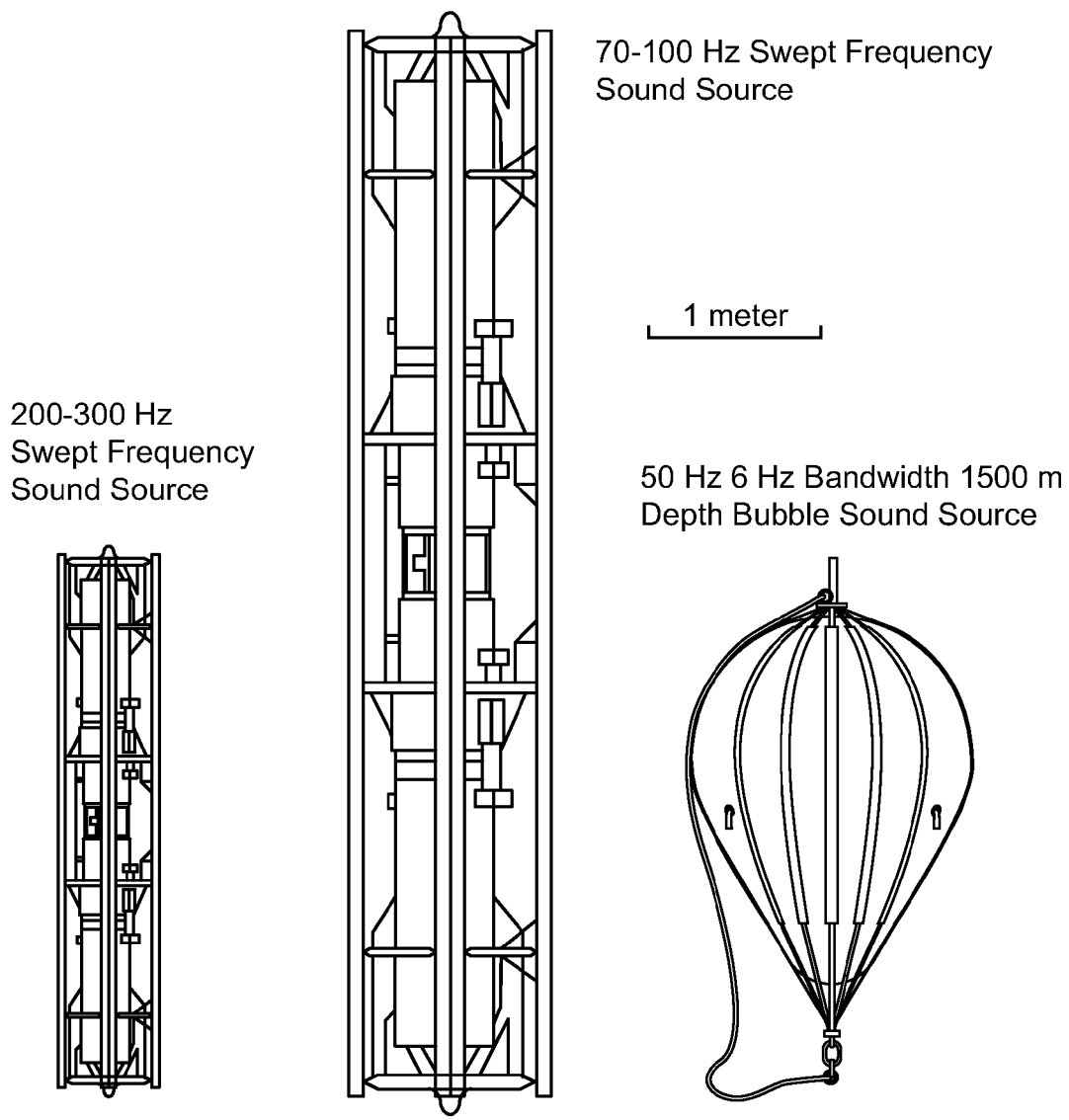
FIG. 7 is an illustration comparing exemplary sizes of low frequency sound sources to a size of an exemplary bubble sound source.

FIG. 7 is an illustration comparing exemplary sizes of low frequency sound sources to a size of an exemplary bubble sound source.

Figure 8:
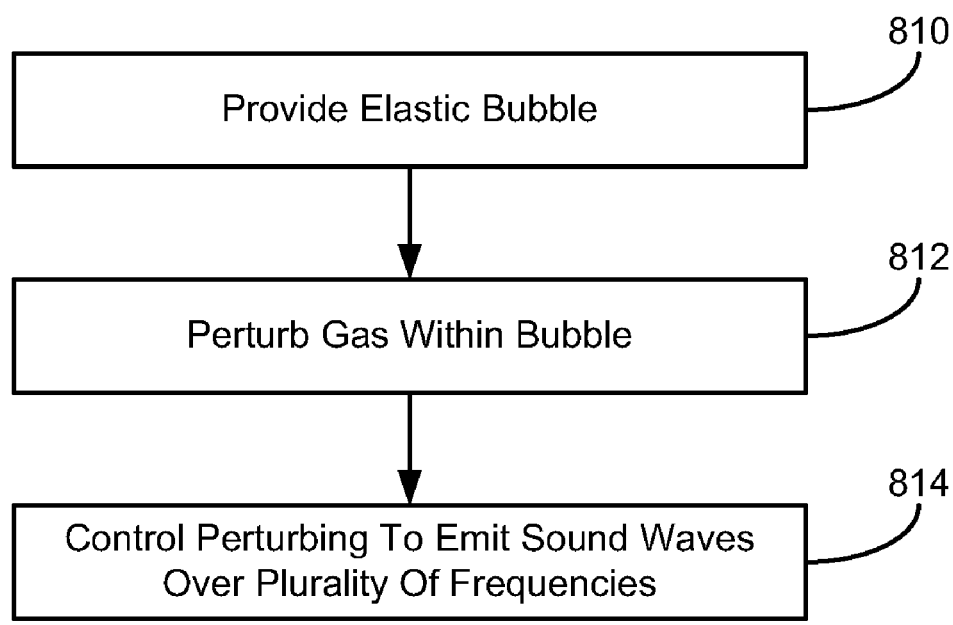
FIG. 8 is a flowchart of a method of generating underwater sound waves, according to an exemplary embodiment.

FIG. 8 is a flowchart of a method of producing sound, according to an exemplary embodiment. At a step 810, an elastic bubble filled with a gas is provided into an underwater environment. The environment may be a shallow or deep underwater environment, depending on the use. At a step 812, the gas within the bubble is perturbed in any of a variety of ways. At a step 814, the perturbing of the gas within the bubble is controlled to emit sound waves over a plurality of frequencies. The frequencies may be discrete frequencies or a linear sweep of frequencies over a range of frequencies (e.g., a chirp). The perturbing may be computer-controlled. As described above, the resonance frequency of the bubble may further be controlled with the computer or another computer by adjusting (increasing or decreasing) the volume or pressure of air within the bubble.

Figure 9A:
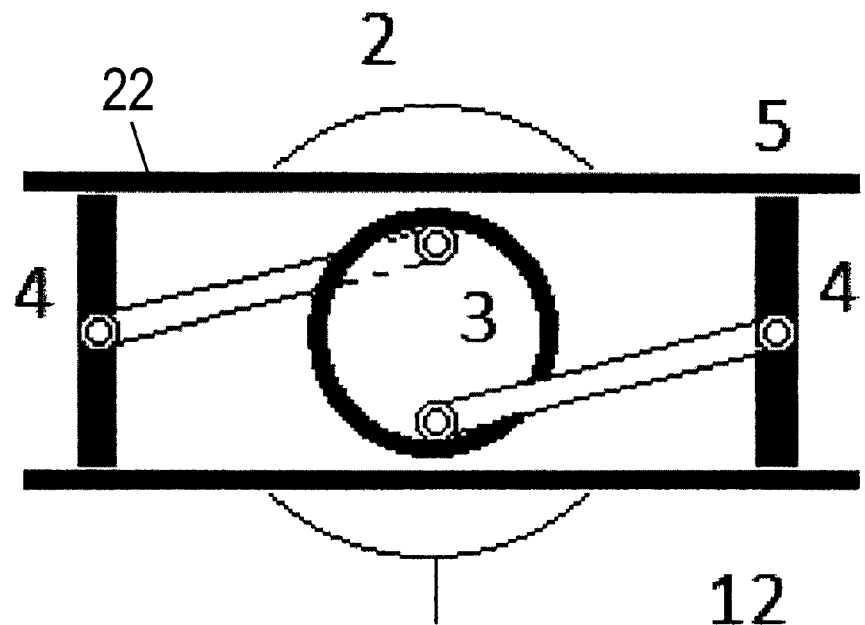
FIG. 9A is a diagram of an actuator, according to an exemplary embodiment.
Figure 9B:
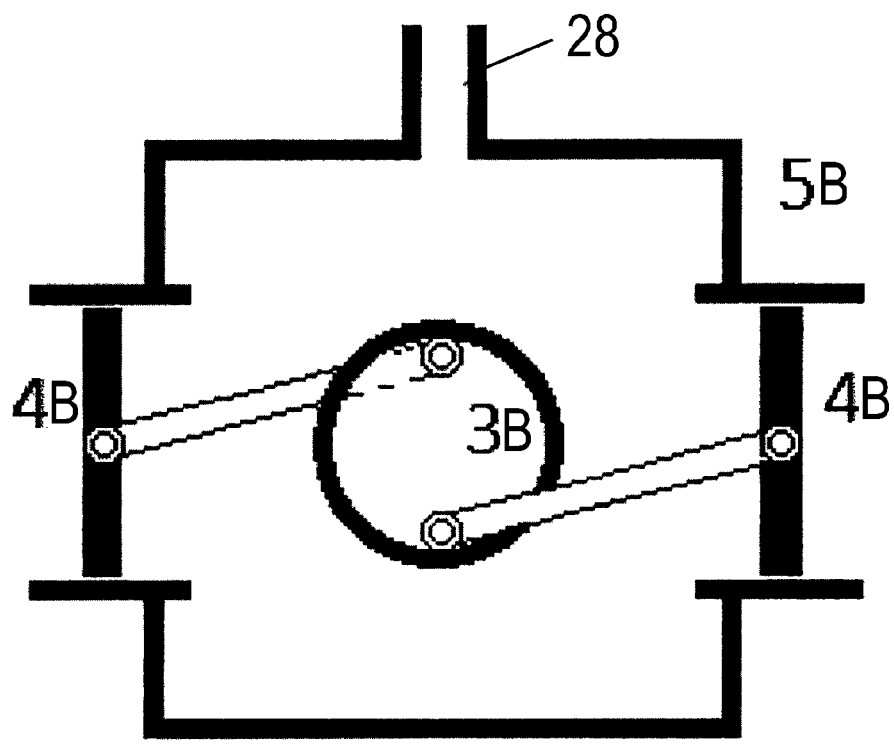
FIG. 9B is a diagram of an actuator, according to another exemplary embodiment.

The exemplary embodiments have been described herein with reference to a symmetrical air pump with opened cylinders, a closed central part between the cylinders an driven by an electric motor. Other actuators are contemplated. FIG. 9A shows the first embodiment of a symmetrical force-balanced mechanical actuator, which has a sealed cylinder 22 with two symmetrically moving pistons 4. This embodiment may be used in a system sweeping in a large frequency bandwidth, and may be used in a shallow water application. FIG. 9B shows a second embodiment of a symmetrical force-balanced mechanical actuator, which has a Helmholtz resonator camera (similar to known low-frequency subwoofers) with a narrow throat 28. Unlike the embodiment of FIG. 9A, the embodiment of FIG. 9B will have a resonance frequency in addition to the main bubble resonance. The bubble resonance frequency and driver resonance frequency may be closely grouped to form a doubly resonant projector. This provision yields a transmitting bandwidth of ½ octave or greater. The driver for the bubble projector may supply greater blocked pressure and reduced volume displacement than the direct emitter when both are operating at the same radiated power. The driver of FIG. 9B can be used as a deep-water variant to expand the bandwidth of the system.

Preferably, the actuator will be balanced for internal forces to keep the actuator from unexpected vibrations, in order to improve efficiency. Motor speed control may be done with any kind of modulation, such as phase modulation, frequency modulation, pulse code modulation (PCM), etc.

The bubble may be of a variety of different sizes. For example, the bubble may be at least 0.2 meters tall or in diameter or less than 4 meters tall or in diameter.

The sound source may be configured to emit sound of at least about 5 Hz, or less than about 150 Hz, or preferably between 10 Hz and 150 Hz or between 10 Hz and 100 Hz.

The sound source may be configured to provide a sound pressure level of greater than or equal to about 200 dB re 1 uPa/Hz @ 1 m.

The sound source may be configured to have an efficiency of at least about 10%, or less than about 30%.

The sound source may be configured to keep the bubble in a predetermined shape (e.g., sphere, fully inflated, etc.) under high water pressure at a depth of 1 kilometer or greater, or a depth of 1.5 kilometers or greater. A frequency control loop can be used for keeping pressure inside the bubble under necessary values.

Processing circuit 14 may comprise analog and/or digital circuit components, such as one or more microprocessors, microcontrollers, application-specific integrated circuits, interfaces, buses, A/D converters, etc. The circuit components may be configured or arranged to perform one or more of the functions or steps described herein, as well as other functions related to or needed to perform the functions or steps described herein. In one example, processing circuit 14 may comprise a non-transitory computer-readable storage medium, such as a memory, encoded with computer instructions that, when executed by a processor, perform the functions or steps described herein.

What is claimed is:

1. A sound source, comprising:
    an elastic bubble configured to be filled with a gas;
    a volume velocity actuator configured to perturb the gas within the bubble by changing the volume of gas within the bubble, wherein the volume velocity actuator is disposed within the bubble, the volume velocity actuator comprising an electro-mechanical motor comprising a plurality of pistons symmetrically moving in opposite directions with a closed space between the pistons, wherein the volume velocity actuator is configured to change the volume and pressure inside the bubble proportionally to a control signal; and
    a processing circuit configured to provide a control signal to the volume velocity actuator to cause the volume velocity actuator to perturb the gas within the bubble at a frequency defined by the control signal.

2. The sound source of claim 1, wherein the bubble has a resonant frequency and the volume velocity actuator has a resonant frequency, wherein the bubble resonant frequency and the volume velocity actuator resonant frequency are about the same.

3. The sound source of claim 1, further comprising a controllable gas source configured to increase and decrease a volume of gas within the bubble.

4. The sound source of claim 3, further comprising a sensor configured to sense sound generated by the bubble and to transmit a sensed signal to the processing circuit, wherein the processing circuit is configured to adjust the controllable gas source to keep a resonance frequency of the bubble approximately equal to a frequency of the sensed sound.

5. The sound source of claim 4, wherein the processing circuit is configured to detect a phase difference between the sensed signal and the control signal and to adjust the controllable gas source based on the phase difference.

6. The sound source of claim 4, wherein the processing circuit is configured to control the sound source to perform a linear sweep of frequencies, wherein the processing circuit is further configured to adjust the controllable gas source to keep the resonance frequency approximately equal to a frequency of the sensed sound across at least a portion of the linear sweep of frequencies.

7. A method of generating underwater sound waves, comprising:
    providing an elastic bubble filled with a gas into an underwater environment;
    perturbing the gas within the bubble using a volume velocity actuator, wherein the volume velocity actuator is disposed within the bubble, the volume velocity actuator comprising an electro-mechanical motor comprising a plurality of pistons symmetrically moving in opposite directions with a closed space between the pistons, wherein the volume velocity actuator is configured to change the volume and pressure inside the bubble;
    controlling the perturbing of the gas within the bubble to emit sound waves over a plurality of frequencies; and
    controlling a resonance frequency of the bubble to approximately equal a radiated signal of the bubble.

8. The method of claim 7, wherein the controlling further comprising generating a digitally synthesized signal waveform and providing the signal waveform to an actuator source.

9. The method of claim 7, wherein the resonance frequency of the bubble is controlled by adjusting a volume of gas within the bubble.

10. The method of claim 7, wherein the controlling further comprises perturbing the gas to emit sound waves over a linear sweep of frequencies and controlling a resonance frequency of the bubble to approximately equal a frequency of sensed sound across at least a portion of the linear sweep of frequencies.

* * * * *